(12) United States Patent
Schultheiss et al.

(10) Patent No.: US 10,078,001 B2
(45) Date of Patent: Sep. 18, 2018

(54) MODE CONVERTER FOR FILLING LEVEL RADAR

(71) Applicant: VEGA Grieshaber KG, Wolfach (DE)

(72) Inventors: Daniel Schultheiss, Hornberg (DE); Klaus Kienzle, Zell am Harmersbach (DE); Malgorzata Janson, Stutensee (DE)

(73) Assignee: VEGA GRIESHABER KG, Wolfach (DE)

( * ) Notice: Subject to any disclaimer, the term of this patent is extended or adjusted under 35 U.S.C. 154(b) by 151 days.

(21) Appl. No.: 14/767,835

(22) PCT Filed: Apr. 23, 2014

(86) PCT No.: PCT/EP2014/058241
§ 371 (c)(1),
(2) Date: Aug. 13, 2015

(87) PCT Pub. No.: WO2014/173951
PCT Pub. Date: Oct. 30, 2014

(65) Prior Publication Data
US 2015/0362354 A1   Dec. 17, 2015

(30) Foreign Application Priority Data
Apr. 24, 2013 (EP) ................................... 13165221

(51) Int. Cl.
*G01F 23/284* (2006.01)
*H01P 1/16* (2006.01)
(Continued)

(52) U.S. Cl.
CPC .............. *G01F 23/284* (2013.01); *H01P 1/16* (2013.01); *H01P 1/163* (2013.01); *H01P 5/085* (2013.01);
(Continued)

(58) Field of Classification Search
CPC ...... G01F 23/284; H01P 11/002; H01P 1/163; H01P 5/085; H01P 1/16; Y10T 29/49018;
(Continued)

(56) References Cited

U.S. PATENT DOCUMENTS 3,703,829 A * 11/1972 Dougherty ........... B64D 37/005
73/290 R
4,503,602 A * 3/1985 Hillmann ............... H01B 12/12
174/125.1

(Continued)

FOREIGN PATENT DOCUMENTS

CN   85103379   6/1987
EP   0 162 821   11/1985

*Primary Examiner* — Peter M Bythrow
(74) *Attorney, Agent, or Firm* — Fay Kaplun & Marcin, LLP

(57) ABSTRACT

A mode converter for a level radar includes an input line introducing a high-frequency signal into the mode converter; a helix structure into which a conductor of the input line projects and which includes a plurality of helical electrical conductors; and a waveguide which encloses the helix structure. The helix structure is configured to convert the high-frequency signal from the input line into an H01 mode in the waveguide.

15 Claims, 3 Drawing Sheets

(51) Int. Cl.
*H01P 1/163* (2006.01)
*H01P 5/08* (2006.01)
*H01P 11/00* (2006.01)

(52) U.S. Cl.
CPC ....... *H01P 11/002* (2013.01); *Y10T 29/49018* (2015.01)

(58) Field of Classification Search
CPC ........ G01S 5/0252; G01S 7/003; G01S 7/292; G01S 7/2922; G01S 7/2927; G01S 2013/936; G01S 13/878; G01S 5/0009; G01S 5/0072
USPC .......................................... 342/124
See application file for complete search history.

(56) References Cited

U.S. PATENT DOCUMENTS

| | | | |
|---|---|---|---|
| 4,641,139 A * | 2/1987 | Edvardsson | G01F 23/284 342/124 |
| 5,030,929 A | 7/1991 | Moeller | |
| 5,717,337 A * | 2/1998 | Kelly | G01F 23/26 324/533 |
| 6,266,022 B1 * | 7/2001 | Muller | G01F 23/284 324/644 |
| 6,293,142 B1 * | 9/2001 | Pchelnikov | G01F 23/284 324/640 |
| 6,619,117 B1 * | 9/2003 | Reimelt | G01F 23/284 73/219 |
| 7,453,393 B2 | 11/2008 | Duivenvoorden | |
| 8,842,038 B2 * | 9/2014 | Edvardsson | G01F 23/284 342/124 |
| 2004/0145510 A1 | 7/2004 | Edvardsson | |
| 2009/0145219 A1 * | 6/2009 | Champion | G01F 23/284 73/304 C |
| 2009/0243942 A1 * | 10/2009 | Autti | H01Q 1/243 343/702 |
| 2012/0169527 A1 * | 7/2012 | Edvardsson | G01F 23/284 342/124 |
| 2013/0076573 A1 * | 3/2013 | Rappoport | H01Q 1/243 343/702 |
| 2013/0265199 A1 * | 10/2013 | Koskiniemi | G01S 19/14 342/450 |
| 2014/0268607 A1 * | 9/2014 | Wicker | H05K 1/0284 361/761 |
| 2014/0290335 A1 * | 10/2014 | Shanks | E21B 47/1005 73/25.05 |
| 2014/0333470 A1 * | 11/2014 | Blodt | G01S 7/026 342/124 |

* cited by examiner

MODE CONVERTER FOR FILLING LEVEL RADAR

FIELD OF THE INVENTION

The invention relates to the field of filling level measurement using radar. In particular, the invention relates to a mode converter for a filling level radar, to a filling level radar, to a converter body for a mode converter and to a method for manufacturing a converter body.

BACKGROUND OF THE INVENTION

Level measurement using radar is based on a distance measurement in which the transit time of a radar signal or high-frequency signal to a surface of a filling material in a container is determined and the distance from the emission device of the radar device, for example an antenna horn, to the filling material is derived therefrom.

Normally in radar devices the fundamental mode of the radar signal is excited. In a circular waveguide, this is the H11 mode (also known as the TE11 mode). Once the waveguide or the pipe diameter is greater than the uniqueness range, more and more modes are able to propagate as the diameter increases. For example, with a pipe diameter of 82.5 mm and a frequency of 25 GHz, 233 modes are able to propagate.

In particular for level measurement in stand pipes or bypass lines, the influence of flange connections, pipe outlets and mixing openings, such as holes or slits, can reduce the measurement accuracy, since the different modes are reflected at different intensities at interfering locations of this type.

The different propagation speeds of the different modes can lead to dispersion; in other words, the different transit times mean that a large number of echoes of different timings are produced by the same fill level. In addition, constructive and destructive superpositions lead to amplitude fluctuations, which may also result in measurement inaccuracies.

SUMMARY OF THE INVENTION

The present invention relates to an accuracy measurement of a filling level radar.

One aspect of the invention relates to a mode converter for a filling level radar, which is configured to convert a TEM guide wave into an H01 mode. The mode converter can be attached to a container in which a fill level is to be measured, for example to a bypass line or a stand pipe.

In one embodiment of the invention, the mode converter comprises an input line for introducing a high-frequency signal into the mode converter; a helix structure into which a conductor of the input line projects and which comprises (or consists of) a plurality of helical electrical conductors; and a waveguide which encloses the helix structure. The helix structure is configured to convert the high-frequency signal from the input line, for example a TEM guide wave, into an H01 mode in the waveguide. It will be appreciated that the mode converter can also conversely convert an H01 signal into a high-frequency signal in the input line.

Via a cable, which is for example connected to a control system, in other words the high-frequency part of the level radar, the high-frequency signal can be introduced into the input line, is converted into the H01 mode by the mode converter, and is subsequently coupled into a stand or bypass pipe. A high-frequency signal reflected by the filling material is converted back into a TEM guide wave by the mode converter and fed back into the cable or the input line, where it can subsequently be reprocessed and evaluated in the high-frequency part.

The H01 mode (or H01 wave type) is the only mode (apart from the higher-mode H02-H0n modes) which does not have any portions of the electrical field on the edge (or inside) and in the centre of a waveguide. Thus, when an H01 mode propagates through a pipe (for example a stand pipe), no longitudinal currents which might be interrupted by slits, holes, outlets or pipe connections flow in the pipe. The H01 mode does generally require a boundary so as to be able to propagate, but is only influenced slightly by non-idealness of the boundary.

Thus, using the mode converter, the influence of flange connections, pipe outlets and mixing openings may be reduced, in particular in stand pipe and bypass applications. In this way, better measurement accuracy may be achieved.

A further advantage of the H01 mode is the low losses thereof. The H01 mode may have the lowest attenuation of all waveguide waves.

The input line may be a coaxial line comprising an internal conductor and an electrically conductive casing. Via the internal conductor, the high-frequency signal can be coupled into the mode converter and the reflected signal can be coupled out. In this context, the internal conductor projects into the helical structure. The casing or external conductor of the coaxial line can be connected to a metal antenna structure, for example a housing, which provides the waveguide in which the helix structure is arranged. The helix structure is not connected to the internal conductor or the external conductor.

The helix structure, which is for example in the form of a cylinder, comprises a plurality of helical or coiled electrical conductors, which are for example in the form of conductor strips. The electrical conductors may be arranged so as to be symmetrical about a central axis of the helix structure, and extend around the central axis in a coil shape. Predominantly only the H01 mode is excited by the coiled structure, and all other modes of propagation are suppressed in an optimal manner.

The number of spaces, the length, the angle, the width and the thickness of the electrical conductors or conductor strips influence the transmission properties and conversion properties of the helix structure. Above all, the electrical conductors should be conductive but need not be interconnected.

The waveguide of the mode converter, for example a circular waveguide, encloses the helix structure at a distance, in such a way that for example there is a region filled with air or with a dielectric medium between the helix structure and the inside of the waveguide, in such a way that the electrical field of the H01 mode can form there.

In one embodiment of the invention, the conductor of the input line projects into the helix structure by more than 10%, more than 40% or more than half of the length of the helix structure. In this way, a TEM guide wave can be emitted from the input line into the interior of the helix structure and subsequently converted to the H01 mode in the portion of the waveguide in which the helix structure is applied.

In one embodiment of the invention, the conductor of the input line is an internal conductor of a coaxial cable or is connected to the internal conductor of a coaxial cable. The mode converter may for example comprise a plug into which the end of a coaxial cable can be screwed or plugged.

In one embodiment of the invention, the waveguide is formed by a housing of the level radar. This housing may comprise a cover through which the conductor of the input line projects into the waveguide. For example, a plug for a coaxial cable may be attached to the cover. The housing may further comprise an opening to which an antenna horn for a level radar can be fixed.

In one embodiment of the invention, the helix structure is carried by a dielectric body which is arranged in the waveguide (and which is also referred to as a converter body in the following). The helix structure and the dielectric body may form a converter body which on the one hand carries the helix structure and on the other hand is fixed to the housing of the mode converter. For example, the converter body may project through the aforementioned opening in the housing and be shaped in such a way that it is held in the housing by means of the antenna horn. In this way, the converter body seals off the interior (in other words the waveguide) of the mode converter from the container in which the fill level is to be measured, and conducts the high-frequency signal which has been converted into the H01 mode into for example a stand or bypass pipe.

In one embodiment of the invention, the dielectric body carries the helix structure on the outside thereof. The dielectric body, which is for example made of plastics material, may for example comprise a cylindrical portion to the outside of which the helix structure is applied. However, it is also possible for the dielectric body to be hollow and for the helix structure to be applied to the inside thereof. The dielectric material of the dielectric body may for example be PP, PTFE, PEEK (polyether ether ketone), glass or ceramic material.

The terms "cylinder" and "cylindrical portion" mean that the relevant components are substantially cylindrical. For example, these components may be slightly conical in form (as a result of the manufacture thereof) and have outer or inner surfaces at an inclination of approximately 1° to 2° to the central axis of the components.

A further aspect of the invention relates to a level radar comprising a mode converter as disclosed above and in the following. As well as the mode converter, the level radar may for example comprise a control system which is attached either directly to the mode converter or at a distance therefrom and which can generate the high-frequency signal and evaluate a reflected high-frequency signal. The control system may be connected to the mode converter via a coaxial cable.

A further aspect of the invention relates to a converter body for a mode converter as disclosed above and in the following. The converter body can be introduced into a housing of the mode converter which simultaneously forms a waveguide in which a helix structure applied to the converter body is received.

In one embodiment of the invention, the converter body comprises a helix structure consisting of a plurality of helical electrical conductors; a dielectric body comprising a cylindrical portion which is enclosed by the helix structure; and a socket in the cylindrical portion for receiving a conductor of an input line. The socket may be an (optionally axial) hole or opening, into which the conductor can be inserted, along an axis of the cylindrical portion.

The first portion of the dielectric body may serve to carry the helix structure and may comprise an axial opening into which for example the internal conductor of a coaxial cable can be introduced.

In one embodiment of the invention, the converter body further comprises a second cylindrical portion for sealing off a housing, in which the first cylindrical portion comprising the helix structure is received. The second portion may have a greater diameter than the first cylindrical portion. The second cylindrical portion may comprise one or more depressions, in which one or more sealing rings can be received, on the outside thereof.

In one embodiment of the invention, the converter body further comprises a conical portion between the first portion and the second portion for bracing the converter body on the housing. The opening in the housing, from which the converter body projects out of the housing, may have a corresponding conical inner surface.

In one embodiment of the invention, the converter body further comprises an emission cone, which connects to the second cylindrical portion in such a way that a shoulder, by means of which the converter body can be fixed in the housing, is formed on the second cylindrical portion. For example, an antenna horn, comprising a flange which has a smaller diameter than the opening and on which the shoulder on the second cylindrical portion can be braced, may be fastened via the opening in the housing.

A further aspect of the invention relates to a converter body for a mode converter, for example as disclosed above and below. It will be appreciated that features of the method may also be features of the converter body and conversely features of the converter body or of the mode converter may also be features of the method.

In one embodiment of the invention, the method comprises the steps of: providing a carrier body; and attaching a helix structure to the carrier body by metallising a plurality of helical strips on the outside of the carrier body. This may for example take place using a 3D MID manufacturing method (MID=moulded interconnect devices).

It may also be possible to apply the helix structure to a thin film (for example made of polyimide). The film having the applied structure can simply be wound around the carrier body or glued on.

In one embodiment of the invention, the carrier body is made of a plastics material which is suitable for metallisation by laser direct structuring (LDS) and/or the helix structure may be applied to the carrier body by LDS. The material may for example be "TECACOMP PEEK LDS" © from Ensinger.

A material suitable for LDS may comprise a metal oxide additive which can be activated using a laser beam. At locations where the laser beam activates the material of the carrier body, nuclei are formed on which a metal coating can be deposited in a bath. The helix structure can thus be applied to the carrier body using a laser beam.

In one embodiment of the invention, the entire converter body is made of the plastics material. In particular, the plastics material of the entire converter body may be formed in a single piece and/or the entire converter body may consist of a plastics material suitable for LDS.

However, it may also be possible for the converter body to be formed in a plurality of pieces.

In one embodiment of the invention, the method further comprises the step of: attaching the carrier body to a further plastics material body, in such a way that the carrier body forms a first portion of the converter body to which the helix structure is applied and the further plastics material body forms at least a second portion by which the converter body can be fixed to a housing.

The further, second plastics material body may be made of a further, second plastics material body, which for example has more suitable dielectric properties than the plastics material of the carrier body and/or which is suitable, for example because of the stability thereof, for resisting the potentially aggressive content of the container in which the fill level is measured.

Overall, the dielectric properties of the converter body can be determined by the carrier body and the second plastics material body.

In one embodiment of the invention, the carrier body is a solid cylinder, in such a way that the converter body merely comprises the plastics material of the carrier body in the first portion in the interior of the helix structure. The solid cylinder may for example comprise a thread which can be screwed into a corresponding thread of the further plastics material body. It will be appreciated that in the present application a cylinder may always mean a solid cylinder.

In one embodiment of the invention, the carrier body is a hollow cylinder at least in part. The carrier body can be attached to the further plastics material body by being slid onto the further plastics material body. In this case, in the first portion the converter body may be formed (at least in part) of a core comprising the plastics material of the further plastics material body, which is enclosed by the hollow cylinder of the carrier body.

In the following, embodiments of the invention are described in detail with reference to the appended drawings.

BRIEF DESCRIPTION OF THE DRAWINGS

Identical or similar parts are provided with like reference numerals.

DETAILED DESCRIPTION OF EMBODIMENTS

Figure 1:
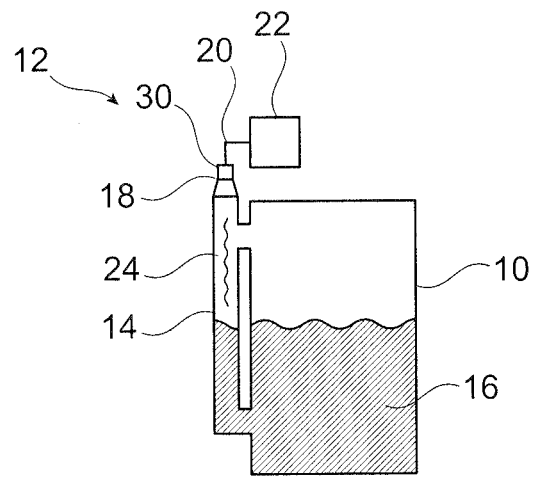
FIG. 1 shows schematically a container comprising a level radar in accordance with an embodiment of the invention.

FIG. 1 shows a container 10 comprising a level radar 12 which measures the fill level in the container. The level radar 12 is attached to the upper end of a bypass line 14, in which a liquid 16 is at exactly the same height as in the interior of the container 10.

The level radar 12 comprises an emission device 18, which is connected to a control system 22 of the level radar 12 via a coaxial line 20. It is possible for the control system 22 to be attached to the emission device 18 directly or to be located at a distance therefrom.

To measure the distance of the emission device 18 from the surface of the liquid 16, the control system 22 generates pulses of a high-frequency signal, which are conveyed to the emission device 18 via the coaxial line 20. The emission device 18 radiates pulses of the high-frequency signal into the bypass line 14 as radar pulses 24, which are subsequently reflected back at the surface of the liquid and received again by the emission device 18. The reflected radar pulses are fed into the coaxial line 20 by the emission device 18 as a reflected high-frequency signal and transferred back to the control system 22. The control system 22 subsequently determines the distance from transit time differences between the pulses. However, it is also possible for the distance to be determined by another method, such as FMCW. In FMCW, the distance is determined by way of the frequency shift between the sent and the received signal.

The high-frequency signal is transferred into the coaxial line 20 as a TEM guide wave. The emission device 18 comprises a mode converter 30, which is configured to convert the TEM guide wave into the H01 mode of a waveguide, which is subsequently emitted as a radar signal. Conversely, the mode converter 30 can convert the reflected signal of the H01 mode back into a TEM guide wave upon receipt.

Since the H01 mode does not have any portions of the electric field at the edge of the bypass pipe 14, which is generally made of metal and forms a waveguide for the radar signal, no longitudinal currents which might be interfered with by disruptions in the bypass pipe 14 (such as slits or openings) flow in the bypass pipe 14. The H01 mode is thus not interfered with, or only slightly, by these disruptions, and this increases the signal quality of the reflected high-frequency signal.

Figure 2:
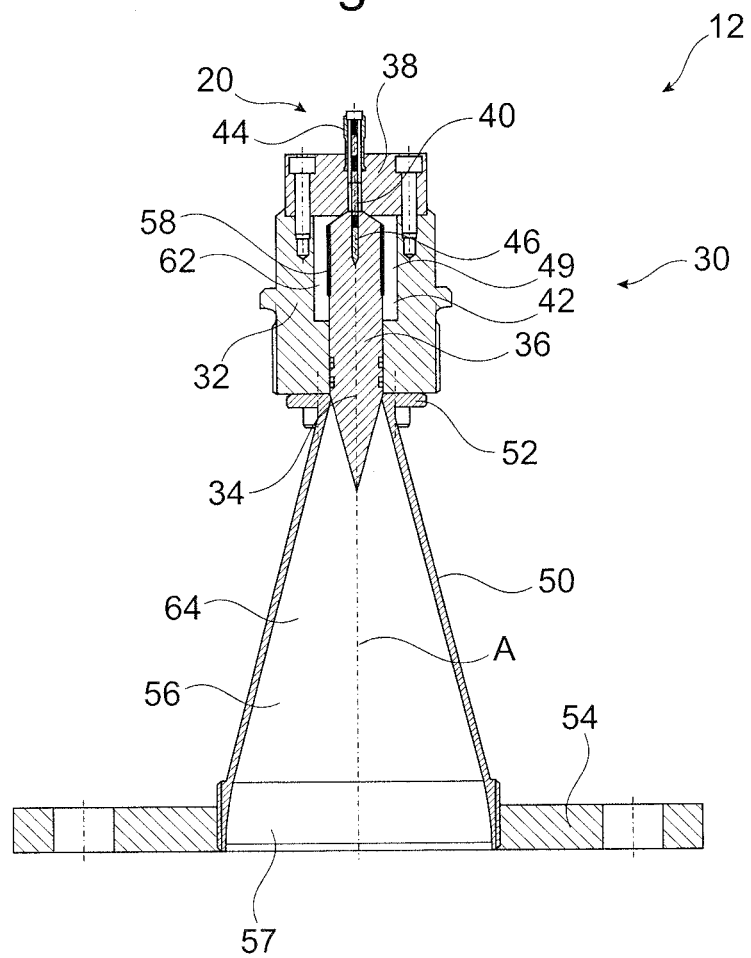
FIG. 2 shows a longitudinal section through a mode converter in accordance with an embodiment of the invention.

FIG. 2 shows an emission device 12 and in particular a mode converter 30 in greater detail. The mode converter 30 comprises a housing 32, which at one end thereof has an opening 34, through which a converter body 36 is inserted into the housing 32. At the other end thereof, the housing 32 is sealed using a cover 38, which is for example screwed to the housing 32.

The cover 38 comprises an opening 40 or hole 40, through which the coaxial line 20 is passed into the interior 42 of the housing 32. In the hole 40, a plug 44 such as a 3.5 mm plug may for example be attached, to which a cable for the coaxial line 20 can be connected. The internal conductor 46 of the coaxial line 20 projects into the interior of the housing and into the converter body 36. For this purpose, the converter body 36 comprises a socket 48 for the internal conductor 46. The internal conductor 46 may be considered an input conductor of the mode converter 30.

The housing 32, the cover 38 and the converter body 36 are substantially rotationally symmetrical about an axis A. The hole 40 in the cover 38, the plug 44, and the opposing opening 34 in the housing 32 are arranged along the axis A.

The interior 42 of the housing 32 is cylindrical (the cylinder axis being coincident with the axis A), in such a way that a circular waveguide 49, in which the converter body 36 (or the front portion thereof) and the internal conductor 46 are arranged, is formed in the interior of the housing 32.

An antenna horn 50 is attached to the end of the housing 32 comprising the opening 34, and comprises a first flange 52 at one end thereof for fastening to the housing 32 and a second flange 54 at the other end thereof for fastening to a container 10 (for example to the bypass line 14). The antenna horn 50 can be screwed to the housing 32 by means of the flange 52.

The antenna horn 50 comprises a conical portion 56, which widens outwards from a diameter somewhat smaller than the external diameter of the opening 34 to an outer opening 57. The antenna horn 50 can be adapted to a desired pipe diameter (for example of the bypass line 14) at the open face or the face comprising the outer opening 57 or have the same diameter as the bypass line 14. The pipe diameter may be 82.5 mm.

The antenna horn 50 may also be rotationally symmetrical about the axis A.

On the converter body 36 there is a helix structure 58, which is configured to convert a TEM guide wave from the coaxial cable 20 and an H01 mode in the waveguide 49 into one another.

Figure 3:
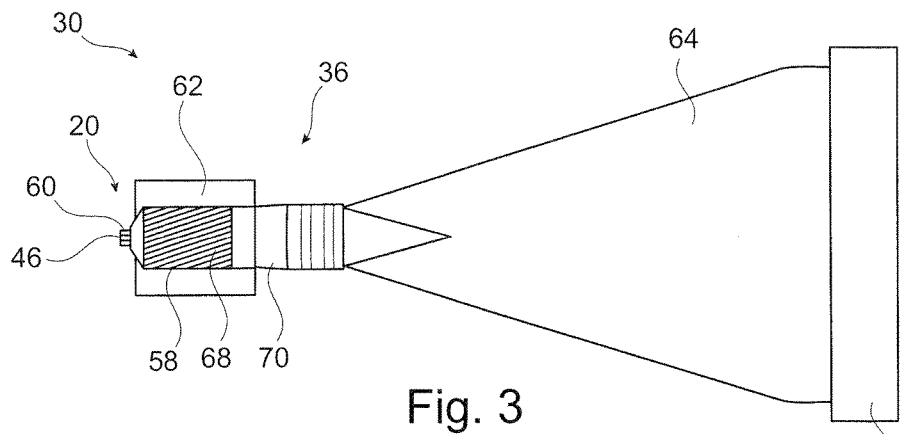
FIG. 3 is a three-dimensional view of a mode converter in accordance with an embodiment of the invention.

FIG. 3 shows the converter body 36, comprising the helix structure 58, and the volumes 60, 62, 64 in which the high-frequency signal is guided in greater detail in three dimensions. The volume 60 is the space between the casing of the coaxial cable 20 and the internal conductor 46 through which the TEM guide wave enters (and leaves) the mode converter 30. The volume 60 may for example be filled with a dielectric plastics material.

The volume 62 is an air region between the converter body 36 or between the helix structure 58 and the inner face of the housing 32 or of the waveguide 49. The electrical field which is converted into the H01 mode may form in the volume 62.

The volume 64 is the interior of the antenna horn 50 by means of which the radar signal is directed into the container 10 or into the bypass line 14 or by means of which the reflected signal is focussed and passed back into the waveguide 49.

Figure 4:
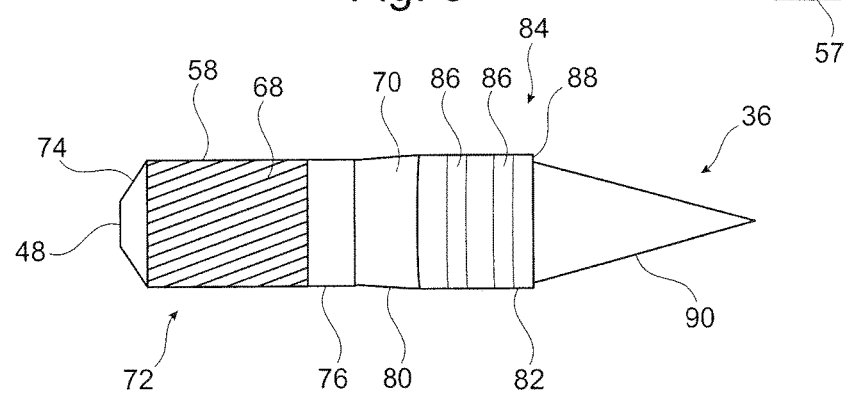
FIG. 4 is a three-dimensional view of a converter body in accordance with an embodiment of the invention.

An enlargement of the converter body 36 comprising the helix structure 58 is additionally shown in FIG. 4. The helix structure 58 comprises a plurality of electrically conductive strips 68, formed in the same manner, which enclose the axis A in a helix or coil shape. The helix structure 58 or the strips 68 are arranged on a body 70 made of plastics material and/or a dielectric material, which provides the majority of the converter body 36.

At the input side 72 thereof, the converter body 36 comprises a conical end 74, which serves to centre the converter body 36 by way of the hole 40 in the cover 38. The coaxial line 20 is also located in the input side 72 of the converter body 36, but the internal conductor 46 thereof may still project up to approximately halfway into the helix structure 58.

The conical end 74 of the converter body 36 widens to a first cylindrical portion 76 on which the helix structure 58 is arranged.

On the output side 78, the converter body 36 widens into a conical portion 80, so as subsequently to become cylindrical again. This second cylindrical portion 82 has a greater diameter than the first cylindrical portion 76.

In this context, the conical portion 80 provides pressure bracing against the container pressure in the container 10. The opening 34 in the housing 32 has a correspondingly conical portion so as to receive the conical portion 80.

The second cylindrical portion 82 is used for sealing. The second cylindrical portion 82 comprises two annular grooves 84, which extend radially around the converter body 36 and in which seals 86 are arranged. The seals 86 may be two or more O-rings, for example made of FKM or FFKM (Kalrez).

After the second cylindrical portion 82, the converter body 36 tapers, forming a shoulder 88 which is supported against the antenna horn 50 or the flange 52 thereof. In this way, the converter body 36 is prevented from falling out or being pulled out of the housing 32 by a vacuum or negative pressure in the container 10.

After the taper, the converter body 36 comprises a cone tip 90 via which the H01 wave is coupled out into the antenna horn 50.

Figure 5:
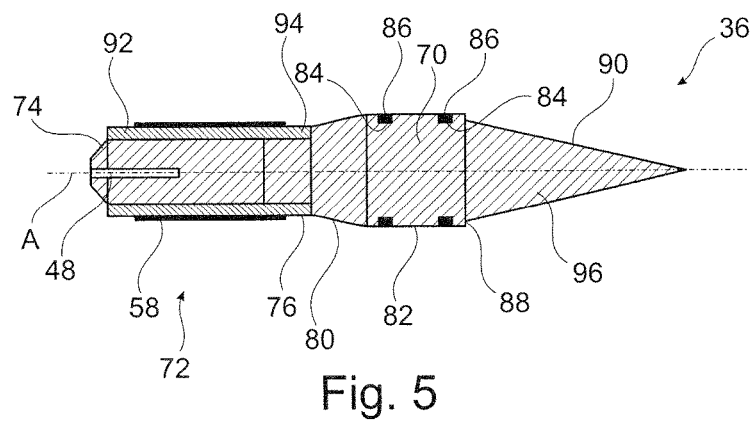
FIG. 5 is a longitudinal section through a converter body in accordance with an embodiment of the invention.
Figure 6:
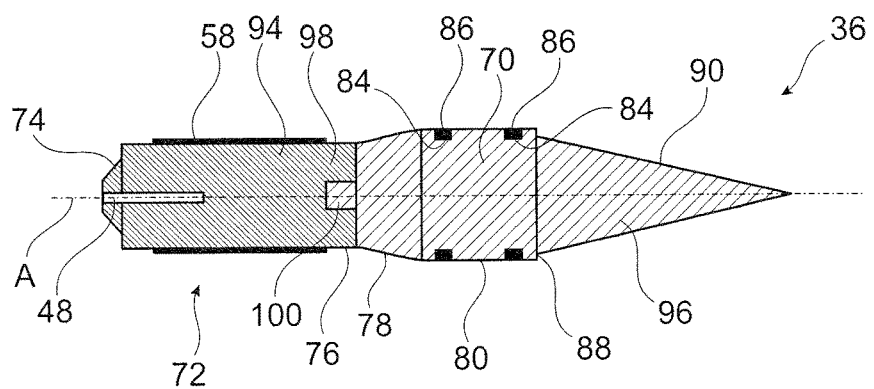
FIG. 6 is a longitudinal section through a converter body in accordance with an embodiment of the invention.
Figure 7:
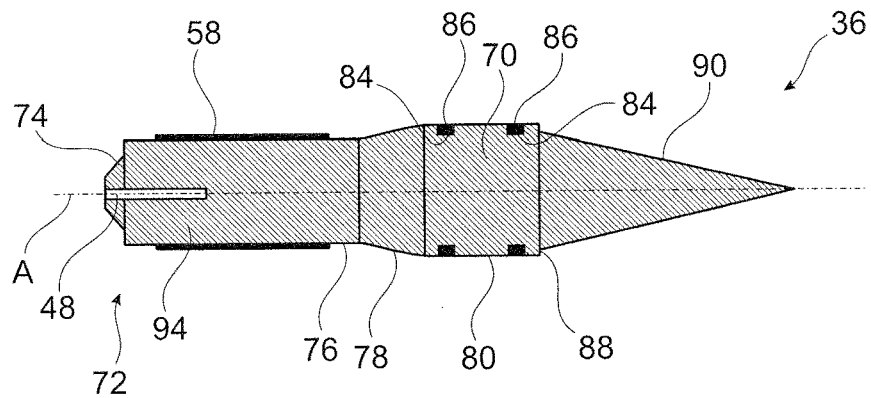
FIG. 7 is a longitudinal section through a converter body in accordance with an embodiment of the invention.

As is shown in FIGS. 5 to 7, the converter body 36 comprising the applied helix structure 58 may be formed in one piece, two pieces or a plurality of pieces.

FIG. 5 shows that the helix structure 58 can be applied to a pipe or a hollow cylinder 92 made of a first material as a carrier body 94. The pipe 92 is subsequently slid onto a further body 96 of a second material. The pipe 92 and the further body 96 together form the dielectric body 70 of the converter body 36.

The first material may be a material suitable for LDS, such as the material "TECACOMP PEEK LDS" © from Ensinger. The second material may be a standard PEEK, such as "TECAPEEK Natur" © from Ensinger.

FIG. 6 shows that the helix structure 58 can be applied to a solid cylinder 98 of a first material as a carrier body 94. The entire input face 72 of the converter body 36 comprising the helix structure 58 may be made of the first material and connected, for example via a thread 100, to the second body 96 of a second material. The materials may be the same materials as those of FIG. 5.

A potential advantage of a two-part construction, as shown in FIGS. 5 and 6, is that only the part or the carrier body 94 comprising the helix structure 58 has to be manufactured from the material suitable for LDS, and the remainder or the further body 96, in other words particularly the part of the adaptation cone 90 contacting the medium, may favourably be manufactured from an industrially known and accepted material, such as "PEEK natur" (without unknown additives) or PTFE, from a semi-finished product, for example by machining by turning.

FIG. 7 shows a single-piece construction for the converter body 36; in this context the entire body 70 of the converter body may be made of the same material, such as the first material from FIGS. 5 and 6.

Figure 8:
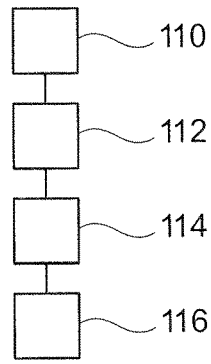
FIG. 8 is a flow chart for a method for manufacturing a converter body in accordance with an embodiment of the invention.

FIG. 8 is a flow chart for a method by which a converter body 36 can be manufactured.

In step 110, a carrier body 94 for the helix structure is provided; for example, the carrier body 94 may be injection-moulded from a material suitable for LDS in the form of a hollow cylinder 92, a solid cylinder 98 or the entire converter body 36. Machining by cutting from a semi-finished product is also possible.

In step 112, the helix structure 58 is applied to the carrier body 94 by metallisation. For example, the helix structure 58 can be drawn in advance on a carrier body 94 of a material suitable for LDS, using a laser, and the helical strips 68 can subsequently be deposited at the locations prepared by the laser, for example in an electroless chemical bath.

If the carrier body 94 provides the entire dielectric body 70 of the converter body 36, the method ends after this step.

Otherwise, in a further step 114, a further plastics material body 96 of a second material can be provided. For example, the further plastics material body 96 can be manufactured from a semi-finished product of the second material by machining by cutting. It is also possible to injection-mould the further plastics material body 96 from the second material.

Subsequently, in step 116, the carrier body is attached to the further plastics material body 96. For example, the carrier body 94 may be a solid cylinder 98 and be screwed to the further plastics material body 96. It is also possible for the carrier body 94 to be a hollow cylinder 92 and for the carrier body 92 to be slid onto the further plastics material body 96.

It should additionally be noted that expressions such as "comprising" or the like do not exclude the possibility of further elements or steps, and "a" and "an" do not exclude the possibility of a plurality. It should further be noted that features or steps disclosed with reference to any one of the above embodiments may also be used in combination with other features or steps of other embodiments disclosed above. Reference numerals in the claims should not be interpreted as limiting.

The invention claimed is:

1. A mode converter for a level radar, comprising:
an input line introducing a high-frequency signal into the mode converter;
a helix structure into which an internal conductor of a coaxial cable of the input line projects, the helix structure including a plurality of helical electrical conductors; and
a waveguide enclosing the helix structure;
wherein the helix structure is configured to convert the high-frequency signal from the input line into an H01 mode in the waveguide.

2. The mode converter according to claim 1, wherein the conductor projects into the helix structure by more than 10% of the length of the helix structure.

3. The mode converter according to claim 1, wherein the waveguide is formed by a housing of the level radar.

4. The mode converter according to claims 1, wherein the helix structure is carried by a dielectric body which is arranged in the waveguide and wherein the dielectric body carries the helix structure on the outside thereof.

5. A level radar, comprising:
a mode converter according to claim 1.

6. The mode converter according to claim 1, further comprising:
a dielectric body including a first cylindrical portion which is enclosed by the helix structure; and
a socket in the first cylindrical portion, the socket configured to receive the internal conductor of the coaxial cable.

7. The mode converter according to claim 6, further comprising:
a second cylindrical portion having a greater diameter than a diameter of the first cylindrical portion, in which the first cylindrical portion including the helix structure is received.

8. The mode converter according to claim 7, further comprising:
a conical portion situated between the first cylindrical portion and the second cylindrical portion.

9. The mode converter according to claim 7, further comprising:
an emission cone connecting to the second cylindrical portion in such a way that a shoulder is formed on the second cylindrical portion.

10. A method for manufacturing a mode converter, comprising the steps of:
providing a carrier body;
including an input line introducing a high-frequency signal into the mode converter;
applying a metallic helix structure to the carrier body by metallizing a plurality of helical strips on the outside of the carrier body using laser direct structuring of the carrier body, the metallic helix structure shaped and sized for an internal conductor of a coaxial cable of the input line to project into the metallic helix structure, the metallic helix structure including a plurality of helical electrical conductors; and
including a waveguide enclosing the metallic helix structure,
wherein the metallic helix structure is configured to convert the high-frequency signal from the input line into an H01 mode in the waveguide.

11. The method according to claim 10, wherein the carrier body is made of a plastics material which is suitable for metallization by a laser direct structuring.

12. The method according to claim 11, wherein the entire converter body is made of the plastics material.

13. The method according to claim 10, further comprising the step of:
attaching the carrier body to a further plastics material body in such a way that the carrier body forms a first portion of the converter body to which the helix structure is applied and the further plastics material body forms at least a second portion by which the converter body is configured to be fixed to a housing.

14. The method according to claim 13, wherein the carrier body is a solid cylinder in such a way that the converter body merely includes the plastics material of the carrier body in the first portion in the interior of the helix structure.

15. The method according to claim 13, wherein the carrier body is a hollow cylinder and the carrier body is attached to the further plastics material body by being slid onto the further plastics material body.

* * * * *